(12) United States Patent
Osawa et al.

(10) Patent No.: US 6,916,875 B2
(45) Date of Patent: Jul. 12, 2005

US006916875B2

(54) CROSSLINKABLE FLUORORUBBER COMPOSITIONS AND METHOD OF PREPARATION

(75) Inventors: Yasuhisa Osawa, Gunma-ken (JP); Shinichi Sato, Gunma-ken (JP); Masatoshi Arai, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 124 days.

(21) Appl. No.: 10/393,011

(22) Filed: Mar. 21, 2003

(65) Prior Publication Data

US 2003/0191234 A1 Oct. 9, 2003

(30) Foreign Application Priority Data

Mar. 22, 2002 (JP) ......................................... 2002-080140

(51) Int. Cl.$^7$ ................................................. C08J 83/00
(52) U.S. Cl. ........................ 524/588; 524/462; 524/544; 528/15; 528/26; 528/31; 528/32; 528/42; 523/205
(58) Field of Search ................................. 524/588, 462, 524/544, 493; 528/15, 26, 31, 32, 42; 523/205

(56) References Cited

U.S. PATENT DOCUMENTS

| 3,445,420 | A |   | 5/1969  | Kookootsedes et al. ...... 260/37 |
| 3,532,649 | A |   | 10/1970 | Smith et al. ................... 260/18 |
| 5,358,996 | A | * | 10/1994 | Takago et al. ............... 524/588 |
| 5,674,966 | A | * | 10/1997 | McDermott et al. .......... 528/32 |
| 5,936,111 | A | * | 8/1999  | Tarumi et al. ............... 556/419 |
| 6,020,450 | A |   | 2/2000  | Matsuda et al. ............... 528/42 |
| 6,297,339 | B1 | * | 10/2001 | Osawa et al. .................. 528/15 |
| 6,512,041 | B2 | * | 1/2003  | Osawa et al. ................ 524/544 |
| 2001/0008914 | A1 |   | 7/2001 | Osawa et al. ................ 524/188 |

FOREIGN PATENT DOCUMENTS

| EP | 0 967 251 A1 | 12/1999 |
| EP | 1 223 194 A1 | 7/2002 |
| JP | 48-10947 | 4/1973 |
| JP | 54-3774 | 2/1979 |
| JP | 9-77944 A | 3/1997 |
| JP | 2001-164115 A | 6/2001 |

* cited by examiner

*Primary Examiner*—David W. Wu
*Assistant Examiner*—Henry S. Hu
(74) *Attorney, Agent, or Firm*—Birch, Stewart, Kolasch & Birch, LLP

(57) ABSTRACT

A crosslinkable fluororubber composition comprising (A) a liquid perfluoro compound having alkenyl groups and a divalent perfluorolakylene or perfluoropolyether structure, (B) a reinforcing filler, (C) a surface treating agent having a fluoroalkyl or fluoropolyalkyl ether group and a silanol group, (D) an addition reactive compound having hydrosilyl groups, and (E) a hydrosilyl or peroxide crosslinker is prepared by mixing components (A) to (C) to form a liquid or paste composition, adding component (D) thereto to form a millable composition, and mixing component (E) therewith. The composition is effectively roll workable and cures into products having excellent physical properties.

15 Claims, No Drawings

CROSSLINKABLE FLUORORUBBER COMPOSITIONS AND METHOD OF PREPARATION

This invention relates to crosslinkable fluororubber compositions which can be readily and briefly loaded with fillers, effectively roll milled and produced in a mass scale and cure into products having excellent heat resistance, solvent resistance, chemical resistance, low-temperature properties and mechanical strength.

BACKGROUND OF THE INVENTION

Prior art vinylidene fluoride base fluororubbers are used in a variety of applications mainly in the automobile and mechanical industries since they are elastomers having good heat resistance and mechanical strength.

These fluororubbers, however, are not satisfactory in chemical resistance. They are readily swollen in polar solvents such as ketone, lower alcohol, and organic acid solvents. They are deteriorated by amine-containing chemicals so that their rubber strength and elongation may substantially decline. With respect to low-temperature properties, the fluororubbers lose rubber elasticity at temperatures below −20° C. to such an extent that they cannot be used as sealants. This generally imposes a limit on the use of fluororubbers in cold areas.

In order to eliminate these drawbacks, curable fluorine-containing compositions comprising a perfluoro compound and a fluorinated organohydrogenpolysiloxane as main components were proposed. These compositions, however, are liquid because they are based on liquid perfluoro compounds having a low degree of polymerization. Then the compositions are suitable in the formed in-place gasket (FIPG) process and liquid injection molding system (LIMS), but less effective in compression molding commonly employed for rubber molding.

In particular, the curable fluorine-containing compositions often prohibit the use of conventional two-plate molds for rubber because of the difficulty of molding and the frequent occurrence of defects by air entrapment. Steady production is difficult unless a special LIMS mold is newly fabricated. The LIMS mold, however, has the problems that it is generally more expensive than the conventional two-plate molds for rubber, the mounting of the mold in a LIMS molding machine is cumbersome, and the molding machine requires time-consuming adjustment after mold mounting. The LIMS mold does not lend itself to the manufacture of a variety of parts in small quantities.

Under the circumstances, the assignee previously proposed in JP-A 2001-164115 (corresponding to U.S. Ser. No. 09/729,774 or US 2001-0008914A) a method for preparing a rubber composition of the type that can be roll milled and molded in a compression molding rubber mold, referred to as millable composition, from a fluorinated curable composition comprising a perfluoro compound and a fluorinated organohydropolysiloxane as main components.

A method of preparing this composition involves adding part of a crosslinker to a liquid polymer for reaction to take place to form a gel-like gum, then adding a filler to the gum so that the liquid polymer is converted to a millable polymer. The filler must be added to and compounded with the gel-like gum rather than usual millable gum. Compounding of the filler with the gel-like gum is time consuming. This is undesirable when the method is scaled up for a mass scale of production.

SUMMARY OF THE INVENTION

Therefore, an object of the invention is to provide a crosslinkable fluororubber composition which can be readily and briefly loaded with fillers, effectively roll milled and produced in a mass scale and cure into products having excellent heat resistance, solvent resistance, chemical resistance, low-temperature properties and mechanical strength; and a method for preparing the same.

It has been found that a crosslinkable fluororubber composition comprising (A) a liquid perfluoro compound having at least two alkenyl groups in the molecule and a divalent perfluoroalkylene or perfluoropolyether structure in the backbone, (B) a reinforcing filler, (C) a surface treating agent having at least one fluoroalkyl or fluoropolyalkyl ether group and at least one silanol group in the molecule, (D) a compound having at least two hydrosilyl groups in the molecule and capable of addition reaction, and (E) a crosslinker having a hydrosilyl group in the molecule and capable of addition reaction or a peroxide crosslinker is prepared by (1) combining and mixing components (A) to (C) to form a liquid or paste composition, (2) adding component (D) to the liquid or paste composition for causing crosslinking to some alkenyl groups in the composition to form a millable composition, and (3) combining and mixing component (E) with the millable composition; that this method allows for easy and brief compounding of the filler in the liquid perfluoro compound as compared with conventional methods, and can be implemented in a large scale for mass production; and that the composition is effectively roll workable and cured products thereof have excellent properties including heat resistance, solvent resistance, chemical resistance, low-temperature properties and mechanical strength.

In one aspect, the invention provides a crosslinkable fluororubber composition comprising (A) 100 parts by weight of a liquid perfluoro compound having at least two alkenyl groups in the molecule and a divalent perfluorolakylene or perfluoropolyether structure in the backbone, (B) 1 to 100 parts by weight of a reinforcing filler, (C) 0.01 to 30 parts by weight of a surface treating agent having at least one fluoroalkyl or fluoropolyalkyl ether group and at least one silanol group in the molecule, (D) a compound having at least two hydrosilyl groups in the molecule and capable of addition reaction, in such an amount as to give a molar ratio of hydrosilyl groups in component (D) to alkenyl groups in component (A) in the range of from 0.1 to 0.99, and (E) a sufficient amount to induce reaction of alkenyl groups in component (A) of a crosslinker having a hydrosilyl group in the molecule and capable of addition reaction or a peroxide crosslinker.

In another aspect, the invention provides a method for preparing the crosslinkable fluororubber composition, comprising the steps of:

(1) combining and mixing components (A) to (C) to form a liquid or paste composition, (2) adding component (D) to the liquid or paste composition for causing crosslinking to some alkenyl groups in the composition to form a millable composition, and (3) combining and mixing component (E) with the millable composition.

DETAILED DESCRIPTION OF THE INVENTION

Component (A)

Component (A) in the fluororubber composition of the invention is a liquid perfluoro compound having at least two alkenyl groups in the molecule and a divalent perfluoroalkylene or divalent perfluoropolyether structure in the backbone.

The perfluoro compound (A) is technically difficult to synthesize into a high molecular weight polymer as typified by a resin or rubber. The perfluoro compound should have at least two alkenyl groups in the molecule and a divalent perfluoroalkylene or divalent perfluoropolyether structure in the backbone. It is preferably a linear perfluoro compound having a viscosity of about 25 to about 1,000,000 centistokes (cSt) at 25° C.

The perfluoro compound is typically of the following general formula (1).

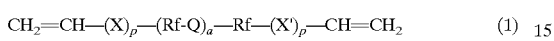
(1)

Herein, X is independently —$CH_2$—, —$CH_2O$—, —$CH_2OCH_2$—, —Y—$NR^1SO_2$— or —Y—$NR^1$—CO— wherein
Y is —$CH_2$— or

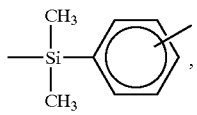

and $R^1$ is hydrogen or a substituted or unsubstituted monovalent hydrocarbon group; X' is independently —$CH_2$—, —$CH_2O$—, —$CH_2OCH_2$—, —$SO_2NR^1$—Y'— or —CO—$NR^1$—Y'— wherein
Y' is —$CH_2$— or

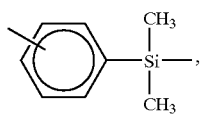

and $R^1$ is hydrogen or a substituted or unsubstituted monovalent hydrocarbon group.

Rf is a divalent perfluoroalkylene group or divalent perfluoropolyether group. Letter p is independently equal to 0 or 1, and "a" is an integer inclusive of 0.

Q is a group of the following general formula (2), (3) or (4).

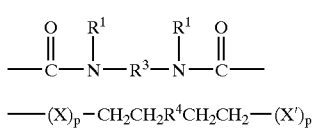
(2)

—$(X)_p$—$CH_2CH_2R^4CH_2CH_2$—$(X')_p$
(3)

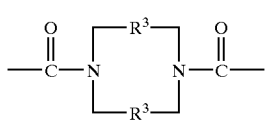
(4)

X, X', p, and $R^1$ are as defined above; $R^3$ is a substituted or unsubstituted divalent hydrocarbon group; and $R^4$ is a substituted or unsubstituted divalent hydrocarbon group which may be separated by at least one intervening atom selected from oxygen, nitrogen, silicon and sulfur atoms, or a group of the following general formula (5) or (6).

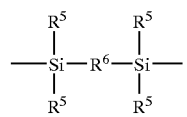
(5)

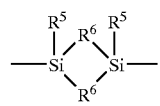
(6)

$R^5$ is a substituted or unsubstituted monovalent hydrocarbon group and $R^6$ is a group containing in its backbone structure at least one atom selected from carbon, oxygen, nitrogen, silicon and sulfur atoms.

Specifically, Rf is a divalent perfluoroalkylene group or divalent perfluoropolyether group. The divalent perfluoroalkylene group is preferably represented by the formula:
—$C_mF_{2m}$— wherein m is from 1 to 10, preferably 2 to 6. The divalent perfluoropolyether group is preferably represented by the formula:

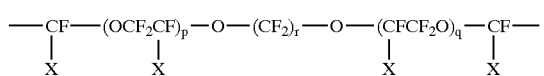

wherein X is F or $CF_3$, p, q and r are integers satisfying $p \geq 1$, $q \geq 1$, $2 \leq p+q \leq 200$, especially $2 \leq p+q \leq 110$, and $0 \leq r \leq 6$,

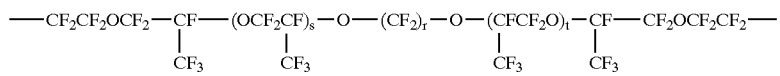

wherein r, s and t are integers satisfying $0 \leq r \leq 6$, $s \geq 0$, $t \geq 0$, $0 \leq s+t \leq 200$, especially $2 \leq s+t \leq 110$,

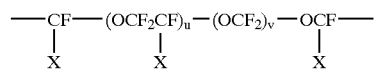

wherein X is F or $CF_3$, u is an integer of 1 to 100 and v is an integer of 1 to 50, or

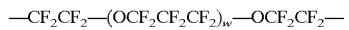

wherein w is an integer of 1 to 100.

Illustrative examples of Rf are given below.

—C$_4$F$_8$—, —C$_6$F$_{12}$—,

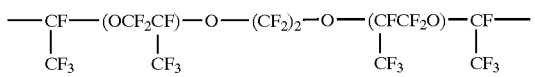

$\overline{n+m}$=2 to 200,

—CF$_2$CF$_2$OCF$_2$(CF$_2$)$_2$CF$_2$OCF$_2$CF$_2$—,

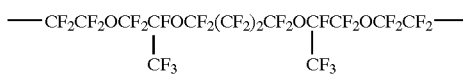

—CF$_2$(OCF$_2$CF$_2$)$_n$(OCF$_2$)$_m$OCF$_2$—

$\overline{n}$=5 to 100, $\overline{m}$=2 to 200,

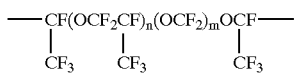

$\overline{n}$=5 to 100, $\overline{m}$=1 to 100,

—CF$_2$CF$_2$(OCF$_2$CF$_2$CF$_2$)$_n$OCF$_2$CF$_2$—

$\overline{n}$=5 to 100

Q is a group of the following general formula (2), (3) or (4).

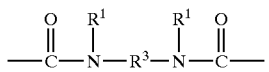    (2)

—(X)$_p$—CH$_2$CH$_2$R$^4$CH$_2$CH$_2$—(X')$_p$—    (3)

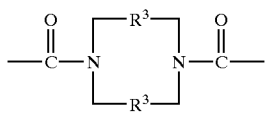    (4)

R$^1$ is hydrogen or a substituted or unsubstituted monovalent hydrocarbon group. The substituted or unsubstituted monovalent hydrocarbon groups are preferably those of 1 to 12 carbon atoms, for example, alkyl groups such as methyl, ethyl, propyl, isopropyl, butyl, isobutyl, tert-butyl, pentyl, neopentyl, hexyl, heptyl, octyl, nonyl and decyl; cycloalkyl groups such as cyclopentyl, cyclohexyl, and cycloheptyl; aryl groups such as phenyl, tolyl, xylyl and naphthyl; aralkyl groups such as benzyl, phenylethyl and phenylpropyl; and substituted ones of these groups in which some or all of the hydrogen atoms are replaced by halogen atoms such as fluoro, chloro and bromo, for example, chloromethyl, bromoethyl, chloropropyl, trifluoropropyl, and 3,3,4,4,5,5,6,6,6-nonafluorohexyl.

R$^3$ is a substituted or unsubstituted divalent hydrocarbon group. The substituted or unsubstituted divalent hydrocarbon groups are preferably those of 1 to 10 carbon atoms, more preferably 2 to 6 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and substituted ones of these groups in which some of the hydrogen atoms are replaced by halogen atoms. It is noted that in formula (4), two R$^3$ groups may be identical or different.

R$^4$ is a substituted or unsubstituted divalent hydrocarbon group which may be separated by at least one intervening atom selected from oxygen, nitrogen, silicon and sulfur atoms. Alternatively, R$^4$ is a group of the following general formula (5) or (6):

    (5)

    (6)

wherein R$^5$ is a substituted or unsubstituted monovalent hydrocarbon group and R$^6$ is a group containing in its backbone structure at least one atom selected from carbon, oxygen, nitrogen, silicon and sulfur atoms.

In formulae (5) and (6) representing the groups of R$^4$, the monovalent hydrocarbon groups represented by R$^5$ are the same as the substituted or unsubstituted monovalent hydrocarbon groups described for R$^1$. Exemplary groups represented by R$^6$ are substituted or unsubstituted divalent hydrocarbon groups, preferably of 1 to 20 carbon atoms, more preferably 1 to 10 carbon atoms, for example, alkylene groups such as methylene, ethylene, propylene, methylethylene, butylene, and hexamethylene, cycloalkylene groups such as cyclohexylene, arylene groups such as phenylene, tolylene, xylylene, naphthylene, and biphenylene, substituted ones of these groups in which some of the hydrogen atoms are replaced by halogen atoms, etc., and mixtures of these substituted or unsubstituted alkylene and arylene groups.

Other examples of the groups represented by R$^6$ are divalent groups containing one or more oxygen, nitrogen, silicon and sulfur atoms in their backbone structure. In the divalent groups, the oxygen atom may intervene in the form of —O—, the sulfur atom may intervene in the form of —S—, and the nitrogen atom may intervene in the form of —NR— wherein R is hydrogen, alkyl of 1 to 8 carbon atoms, preferably 1 to 6 carbon atoms, or aryl. The silicon atom may intervene in the form of an organosiloxane-containing group or organosilylene group. Illustrative examples are given below.

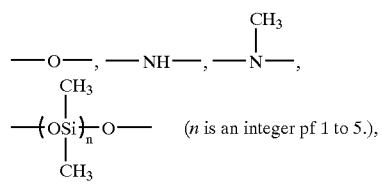

($n$ is an integer pf 1 to 5.),

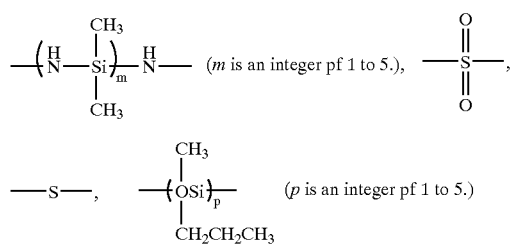

On the other hand, the substituted or unsubstituted divalent hydrocarbon groups represented by $R^4$, which may be separated by at least one atom selected from oxygen, nitrogen, silicon and sulfur atoms, include the substituted or unsubstituted divalent hydrocarbon groups described for $R^6$ and those of the same groups in each of which an oxygen, nitrogen, silicon and/or sulfur atom intervenes midway.

In formula (1), the Q groups represented by formulae (2), (3) and (4) are exemplified by the following groups. Note that in the following formulae, Me is methyl, Ph is phenyl, and R is hydrogen, methyl or phenyl.

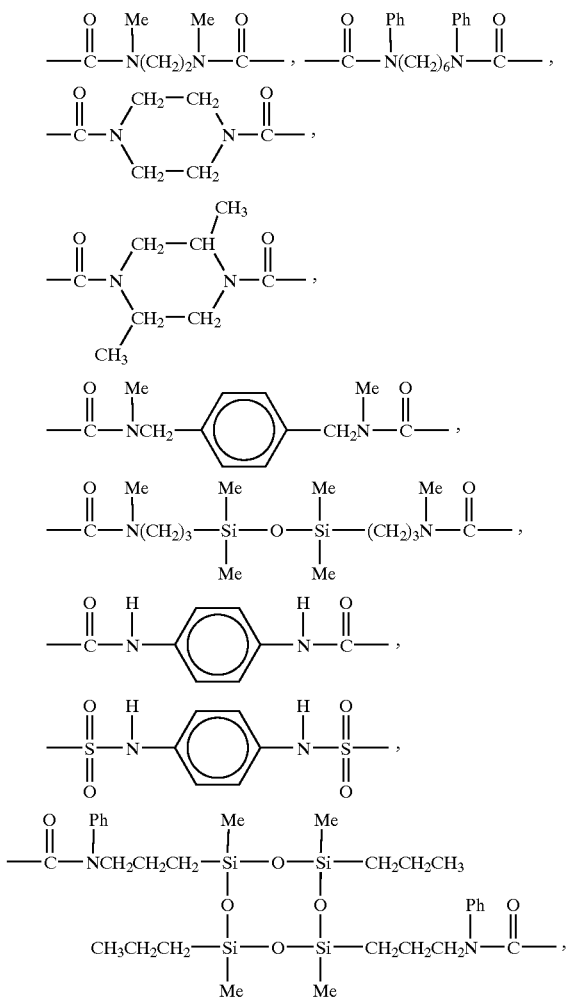

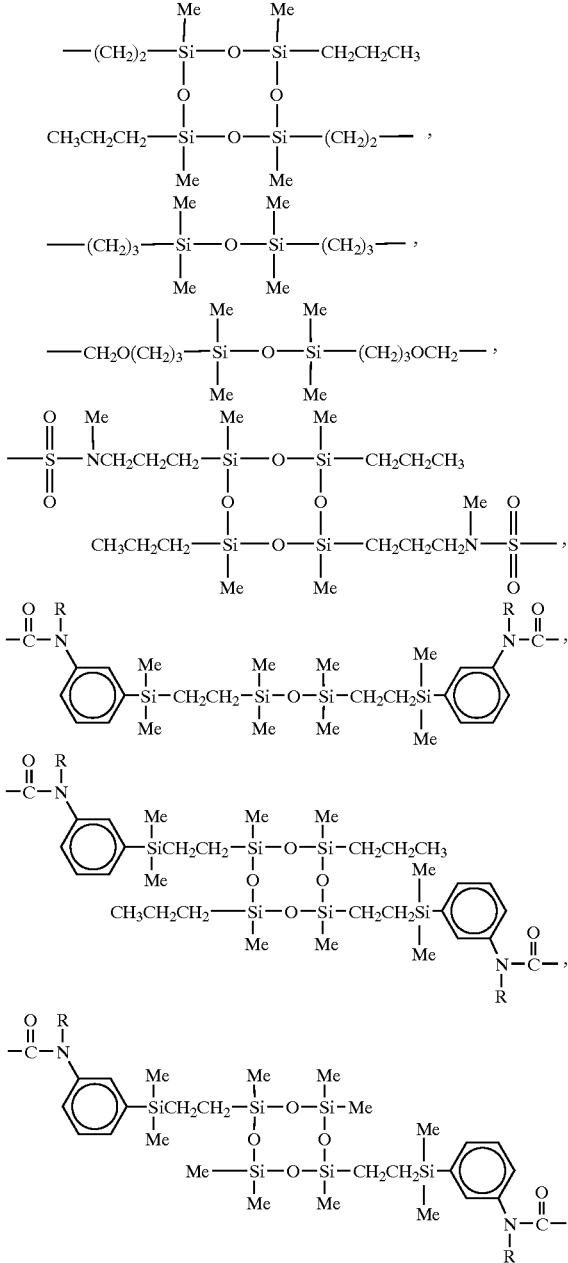

In formula (1), "a" is an integer inclusive of 0. Therefore, the fluorinated compound of formula (1) contains at least one divalent perfluoroalkylene or divalent perfluoropolyether group per molecule. Preferably, "a" is an integer of 0 to 10, especially 0 to 6.

X is independently selected from among —$CH_2$—, —$CH_2O$—, —$CH_2OCH_2$—, —Y—$NR^1SO_2$—, and —Y—$NR^1$—CO—
wherein Y is —$CH_2$— or

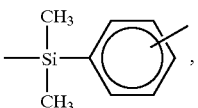

(inclusive of ortho, meta and para-positions), and $R^1$ is hydrogen or a substituted or unsubstituted monovalent hydrocarbon group. It is understood that $R^1$ is as defined previously, and preferably methyl, phenyl or allyl.

X' is independently selected from among —$CH_2$—, —$CH_2O$—, —$CH_2OCH_2$—, —$SO_2NR^1$—Y'—, and —CO—$NR^1$—Y'—
wherein Y' is —$CH_2$— or

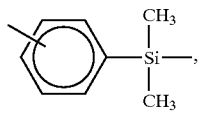

and $R^1$ is as defined above.

Letter p is equal to 0 or 1. The perfluoro compound of formula (1) has a vinyl, allyl or analogous group at either end.

Illustrative examples of the fluoropolyether compound represented by formula (1) are the linear fluoropolyether compounds shown below.

Herein, m and n are integers inclusive of 0, preferably such integers that the compounds may have a viscosity of about 25 to about 1,000,000 cSt at 25° C.

The linear perfluoro compound (A) should preferably have a viscosity of about 25 to about 1,000,000 cSt at 25° C., more preferably about 100 to about 60,000 cSt at 25° C. At a viscosity outside the range, there would arise inconvenient problems including difficulty to form a cured rubber product having the desired properties and poor workability.

Component (B)

Component (B) of the fluororubber composition according to the invention is a reinforcing filler. The reinforcing filler is generally added for the purposes of improving roll workability, mechanical strength, thermal stability, weather resistance, chemical resistance and flame retardance, reducing thermal shrinkage upon curing, and/or reducing the coefficient of thermal expansion and gas permeability of an elastomer as cured. The filler is mainly added for the purpose of improving roll workability and mechanical strength in order to provide a rubber composition of the millable type.

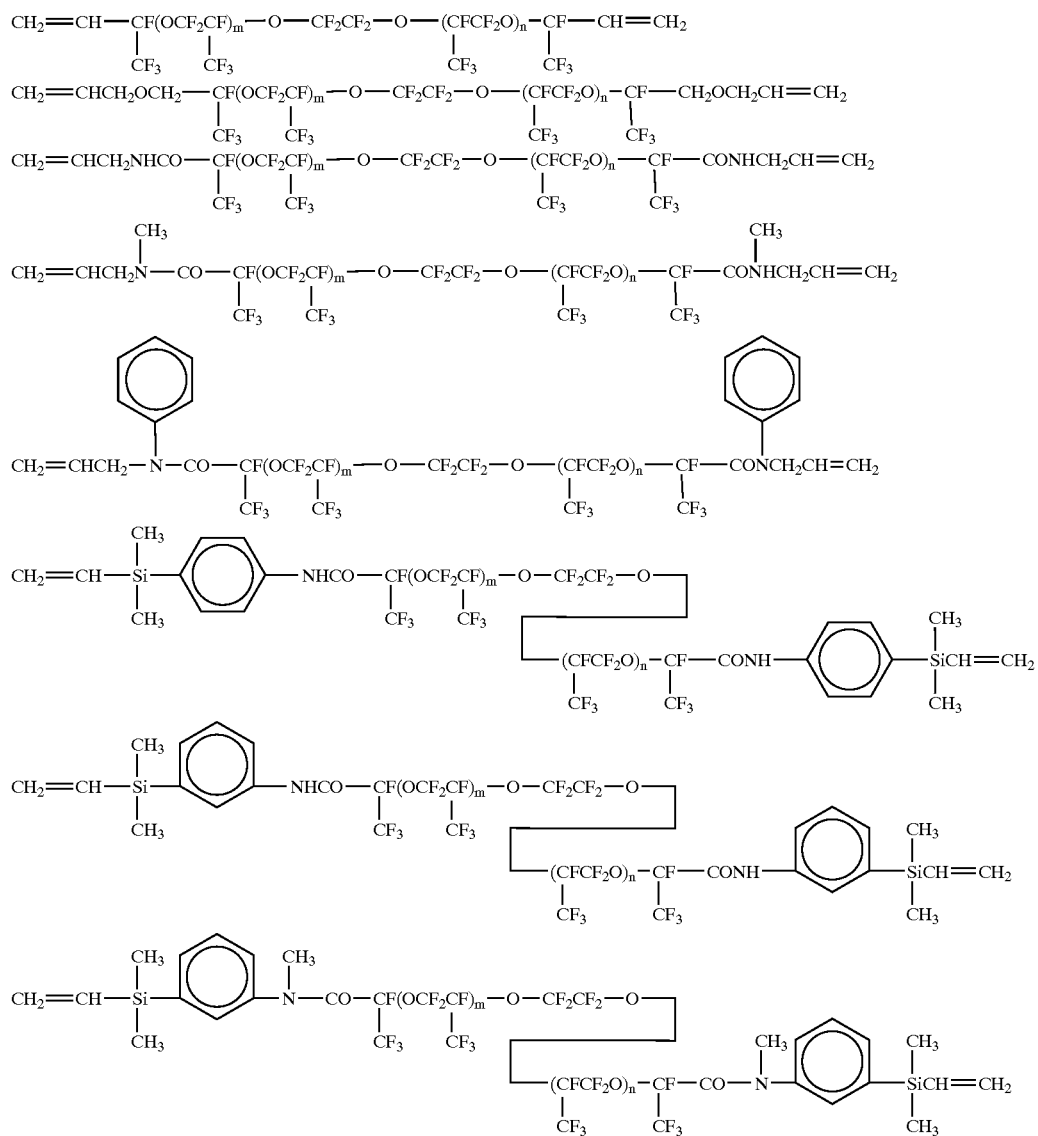

The fillers include fumed silica, colloidal silica, diatomaceous earth, quartz flour, glass fibers, and carbon as well as metal oxides such as iron oxide, titanium oxide and cerium oxide and metal carbonates such as calcium carbonate and magnesium carbonate. The fillers may have been treated with various surface treating agents. Among others, fumed silica is preferred for mechanical strength. Fumed silica treated with a surface treating agent in the form of a compound containing silicon in a molecule such as a silane is especially preferred because it is readily dispersible.

The amount of the reinforcing filler blended is 1 to 100 parts by weight per 100 parts by weight of component (A). Less than 1 part of the filler is insufficient to provide reinforcement and improve roll workability whereas more than 100 parts of the filler detracts from rubber flexibility and prevents the rubber from being wrapped on rolls.

Component (C)

Component (C) is a surface treating agent in the form of a compound having at least one fluoroalkyl group or fluoropolyalkyl ether group and at least one silanol group in the molecule. The fluoroalkyl group is preferably selected from alkyl groups of 1 to 20 carbon atoms, especially 1 to 10 carbon atoms, in which some or all of the hydrogen atoms on the alkyl group are replaced by fluorine atoms, and the compound is preferably selected from silanes and siloxanes of 1 to 20 silicon atoms, more preferably 1 to 5 silicon atoms. This surface treating agent is essential for improving the wettability between the filler and the polymer for facilitating the blending and dispersion of the filler and hence, compounding operation so that the resulting composition is improved in mechanical strength. Accordingly, it must bear in its molecule at least one silanol group having affinity to surfaces of the filler such as fumed silica and at least one fluoroalkyl or fluoropolyalkyl ether group affinity to the perfluoro backbone of the polymer.

The surface treating agent having at least one fluoroalkyl group and at least one silanol group in the molecule is exemplified by compounds of the following formulas. They may be used alone or in admixture of two or more.

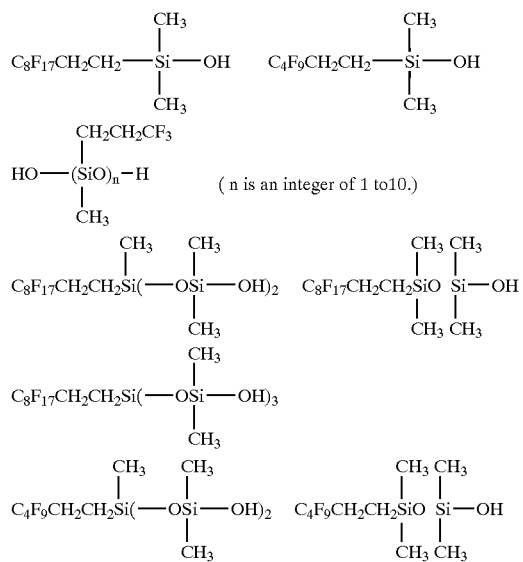

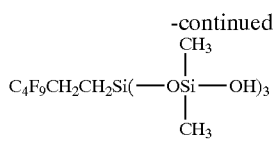

An appropriate amount of the surface treating agent blended is 0.01 to 30 parts by weight per 100 parts by weight of component (A). Less than 0.01 part of the agent achieves ineffective surface treatment so that little improvements in filler/rubber blending (or working) and rubber physical properties are expectable. More than 30 parts of the agent facilitates filler/rubber blending (or working), but gives rise to the problem that an excess of the agent becomes an impurity causing to detract from rubber physical properties. The preferred amount is 0.1 to 20 parts by weight.

Component (D)

Component (D) is a compound having at least two hydrosilyl groups in the molecule and capable of addition reaction with alkenyl groups. Included are organic compounds containing hydrosilyl groups and organic silicon compounds containing hydrosilyl groups. When dispersibility and heat resistance are taken into account, compounds of the following formulae (7) and (8) are preferred.

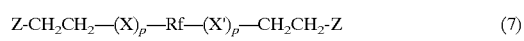

In the formulae (7) and (8), X, X', p, and Rf are as defined above. Z is a group of the following general formula (9):

wherein $R^2$ is a substituted or unsubstituted monovalent hydrocarbon group and b is equal to 1, 2 or 3 for the compound of formula (7) and equal to 2 or 3 for the compound of formula (8).

Specifically, X is independently selected from among —$CH_2$—, —$CH_2O$—, —$CH_2OCH_2$—, —Y—$NR^1SO_2$—, and —Y—$NR^1$—CO—
wherein Y is —$CH_2$— or

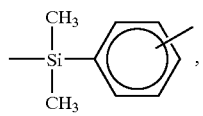

and $R^1$ is hydrogen or a substituted or unsubstituted monovalent hydrocarbon group; X' is independently selected from among —$CH_2$—, —$CH_2O$—, —$CH_2OCH_2$—, —$SO_2NR^1$—Y'—, and —CO—$NR^1$—Y'—
wherein Y' is —$CH_2$— or

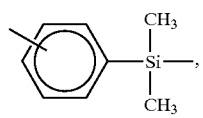

and $R^1$ is hydrogen or a substituted or unsubstituted monovalent hydrocarbon group; Rf is a divalent perfluoroalkylene or divalent perfluoropolyether group; and p is independently equal to 0 or 1.

Illustrative examples of X, Rf and p are as described above. Rf, X and p in formula (7) or (8) may be identical with or different from Rf, X and p in formula (1), respectively.

Z is a group of formula (9).

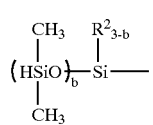

Herein, $R^2$ is a substituted or unsubstituted monovalent hydrocarbon group. The substituted or unsubstituted monovalent hydrocarbon groups are preferably those of 1 to 8 carbon atoms, for example, alkyl groups such as methyl, ethyl, propyl, isopropyl, butyl, isobutyl, tert-butyl, pentyl, neopentyl, hexyl, heptyl, and octyl; cycloalkyl groups such as cyclopentyl, cyclohexyl, and cycloheptyl; aryl groups such as phenyl, tolyl, and xylyl; aralkyl groups such as benzyl and phenylethyl; and substituted ones of these groups in which some or all of the hydrogen atoms are replaced by halogen atoms such as fluoro, chloro and bromo or the like, for example, chloromethyl, bromoethyl, chloropropyl, trifluoropropyl, and 3,3,4,4,5,5,6,6,6-nonafluorohexyl.

Letter b is equal to 1, 2 or 3 for the compound of formula (7) and equal to 2 or 3 for the compound of formula (8).

Component (D) is used in such amounts that the molar ratio of hydrosilyl groups in component (D) to alkenyl groups in component (A) may range from 0.1/1 to 0.99/1, especially from 0.3/1 to 0.8/1. With a ratio of less than 0.1, the resulting polymer merely thickens to some extent and remains still flowable, that is, becomes a liquid rubber which is difficult to sheet by means of a two-roll rubber mill. With a ratio in excess of 0.99, the resulting polymer would become cured rubber to which a filler is added with difficulty or which cannot be wrapped around rolls.

For the addition reaction of component (A) to component (D), it is recommended to use an addition reaction catalyst. Preferred catalysts are platinum group metal compounds. The platinum group metal compounds used herein are generally compounds of noble metals which are expensive. For ease of availability, platinum compounds are often employed. Examples of the platinum compounds include chloroplatinic acid, complexes of chloroplatinic acid with olefins (e.g., ethylene), complexes of chloroplatinic acid with alcohols or vinylsiloxanes, and platinum on silica, alumina or carbon, though not limited thereto. Known as platinum group metal compounds other than the platinum compounds are compounds of rhodium, ruthenium, iridium and palladium, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The amount of the catalyst used is not critical and the desirable curing rate will be achieved with a catalytic amount. From the economical aspect or in order to obtain favorable cured products, an appropriate amount of the catalyst is about 0.1 to about 1,000 ppm, more preferably about 0.1 to about 500 ppm of platinum group metal based on the weight of components (A) and (D) combined.

The conditions for the addition reaction may be determined as appropriate. Reaction may be carried out at room temperature although it is accelerated by heating at about 50 to 200° C.

Component (E)

Component (E) is a crosslinker which is (E-1) a crosslinker having a hydrosilyl group in a molecule and capable of addition reaction or (E-2) a peroxide crosslinker.

The crosslinker (E-1) is typically an organohydrogenpolysiloxane having at least two, preferably at least three, hydrosilyl groups in a molecule. Such organohydrogenpolysiloxanes may be those commonly used in silicone rubber compositions of the addition reaction curing type. In particular, those siloxanes described above as component (D) can be used.

The amount of crosslinker (E-1) added is sufficient to react with residual alkenyl groups in component (A) for thereby curing component (A). From the standpoint of the shelf stability of rubber compositions, as is the case with prior art millable rubber compositions, the crosslinker is desirably added to the polymer composition immediately before rubber molding. It is important for stabilizing rubber physical properties to determine the amount of the crosslinker added by taking into account the type and amount of the crosslinkable compounds used as components (A) and (D). Specifically, the crosslinker is preferably added in such an amount that the ratio of {hydrosilyl groups in component (D) plus hydrosilyl groups in component (E)}/{alkenyl groups in component (A)} may range from 0.5 to 5, especially from 0.8 to 2.

In crosslinker (E-1), an addition reaction catalyst such as a platinum group metal compound may be blended if desired. If the addition reaction catalyst used along with the addition of component (D) is left in the composition, the catalyst need not necessarily be added. The catalyst, if added, is used in a catalytic amount which is as described above.

The other component (E-2) is a peroxide crosslinker. Examples of this crosslinker include dibenzoyl peroxide, dicumyl peroxide, di-t-butyl peroxide, t-butylperoxyacetate, t-butylperoxybenzoate, and 2,5-dimethyl-2,5-di-t-butylperoxyhexane, with the 2,5-dimethyl-2,5-di-t-butylperoxyhexane being preferred from the standpoints of shelf stability and scorch prevention.

The peroxide crosslinker is added in a sufficient amount to cure component (A), preferably 0.1 to 5 parts by weight, more preferably 0.5 to 3 parts by weight per 100 parts by weight of component (A). Less than 0.1 part of the peroxide crosslinker would induce insufficient or slow crosslinking whereas more than 5 parts would adversely affect the physical properties of rubber.

The inventive composition containing components (A) to (E) described above is fully stable although (F) a heat resistance modifier may be further added thereto.

Component (F)

The heat resistance modifier (F) is selected from carbon black, metal oxides, and metal hydroxides. It is believed that the modifier serves to improve heat resistance by absorbing or neutralizing radicals and acidic substances such as hydrogen fluoride generated at high temperature.

The modifier (E) is generally available in powder form. As opposed to the reinforcing filler (B), the modifier is not added for the purpose of improving mechanical strength, but for the purpose of absorbing or neutralizing radicals and acidic substances generated at high temperature. If the modifier (E) is surface treated, its surface activity is lost so that its addition effect becomes low. It is thus undesired to surface treat the modifier (E) or add the modifier (E) simultaneously with the surface treating agent (D).

Examples of useful carbon black include lamp black, various furnace black species and acetylene black. Of these, acetylene black is preferred since it eliminates any potential influence on crosslinking properties and rubber properties by impurities.

The metal oxides include iron oxide, calcium oxide, magnesium oxide, zinc oxide, lead oxide, copper oxide, titanium oxide, aluminum oxide, cadmium oxide, cobalt oxide and cerium oxide. Of these, magnesium oxide, iron oxide and cerium oxide are preferred since they are easy to compound in rubber and remain stable in the compound.

Useful metal hydroxides include potassium hydroxide, calcium hydroxide, magnesium hydroxide, zinc hydroxide, and aluminum hydroxide. Of these, calcium hydroxide is more stable and safe to handle.

The addition of the modifier alone is effective for improving heat resistance although the addition of two or more modifiers achieves a greater improvement. Whether the modifier (E) is added alone or in admixture of two or more, an appropriate amount of the modifier is 0.01 to 10 parts by weight per 100 parts by weight of component (A). Less than 0.01 part may achieve little improvement in heat resistance. More than 10 parts of the modifier may adversely affect the mechanical strength of the rubber because it lacks reinforcement effect unlike fumed silica. More preferably the modifier is used in an amount of 0.1 to 5 parts by weight so that the resulting fluororubber composition may possess both mechanical strength and heat resistance.

In the composition, various additives may be added for the purpose of enhancing its practical utility, if necessary. Such additives include, for example, polysiloxanes containing $CH_2$=CH(R)SiO units wherein R is hydrogen or a substituted or unsubstituted monovalent hydrocarbon group (see JP-B 48-10947) and acetylene compounds (see U.S. Pat. No. 3,445,420 and JP-B 54-3774), both added for controlling the curing rate of the composition, and ionic compounds of heavy metals (see U.S. Pat. No. 3,532,649).

The fluororubber composition of the invention is prepared by a method including the steps of:

(1) combining and mixing components (A) to (C) to form a liquid or paste composition, (2) adding component (D) to the liquid or paste composition for causing crosslinking to some alkenyl groups in the composition to form a millable composition, and (3) combining and mixing component (E) with the millable composition.

Step (1) is to add to the liquid perfluoro compound (A) the filler (B) for adjusting rubber strength and roll workability and the surface treating agent (C) for facilitating filler compounding and improving rubber physical properties, and mixing them together. This step forms a liquid or paste composition which is not roll workable as opposed to millable compositions.

In step (1), any conventional rubber kneading machine such as a rubber kneader, pressure kneader or Banbury mixer may be used. The mixing of components (A) to (C) proceeds at room temperature without trouble although heating may be employed for purposes of stabilizing shearing heat and so on, in the temperature range where the polymer is not decomposed. Heating at 100 to 300° C. for about 10 minutes to 8 hours is sufficient for such purposes.

Step (2) is to add component (D) to the liquid or paste composition. Although the liquid perfluoro compound (A) is difficult from the standpoint of synthesis process to build up its molecular weight to an extent for roll working, step (2) serves to cause crosslinking to some reactive groups in the liquid perfluoro compound (A) utilizing hydrosilyl groups in component (D), for thereby building up the molecular weight. In this sense, step (2) is also referred to as precure step. Through the precure step, the liquid or paste composition resulting from step (1) is converted to a millable composition which is workable on a two-roll rubber mill. Unless a molecular weight buildup is achieved in this step, the composition becomes difficult to work or sheet on a rubber roll mill.

Step (2) can be carried out on a two-roll rubber mill. If component (D) is added and mixed in the rubber compounding machine used in the filler compounding step (1), a need to transfer the composition from one to another machine is eliminated. It is then convenient to carry out step (2) just subsequent to step (1) in a common apparatus, that is, to add and mix component (D) in the same rubber kneading machine (e.g., rubber kneader, pressure kneader or Banbury mixer) used in step (1).

The precure step may be at room temperature although heating may be employed for accelerating addition reaction. Heating at 50 to 200° C. for about 10 minutes to 24 hours is sufficient for such purposes.

When it is desired to add a heat resistance modifier and other additives such as pigments to the inventive composition, step (2) is preferably followed by the step of adding the heat resistance modifier and other additives. For uniform dispersion of these additives, the addition step is preferably carried out between step (2) of compounding the filler and step (3) of compounding the crosslinker. The additives may be added either immediately after step (2) and in the mixing machine (e.g., kneader) used in step (2) or immediately before step (3) and in a mixing machine (e.g., two-roll mill) used in step (3). The temperature and mixing time for the addition of additives need not be carefully controlled as long as the mixing machine is operated under such conditions that the heat resistance modifier and other additives are fully dispersed.

Step (3) is to combine and mix the crosslinker (E), catalyst, crosslinking aids or the like with the millable composition. As the apparatus used in step (3), mixing machines such as kneaders, pressure kneaders and Banbury mixers are less desirable because the mixing heat can cause crosslinking to proceed with the risk of a scorching phenomenon. Desirable are twin-roll rubber mills also capable of sheeting operation, especially equipped with cooling means for suppressing crosslinking from being driven by the heat generated during milling.

In curing the composition of the invention, preferred conditions for primary curing include a temperature of about 100 to 200° C. and a time of about 1 to 30 minutes. Temperatures below 100° C. take a longer curing time, which is undesirable for commercial production. Temperatures above 200° C. have the risk of scorching. The preferred temperature is in the range of about 100 to 200° C. and more preferably about 120 to 170° C. The curing time at such temperatures may be selected as appropriate to ensure that the crosslinking reaction is completed. In order to stabilize the physical properties of the inventive composition, secondary curing is preferably carried out by heating at a temperature of about 100 to 230° C. for a time of about 1 to 24 hours. Secondary curing at temperatures below 100° C. is ineffective whereas temperatures above 230° C. can cause pyrolysis. More preferably, secondary curing is carried out at about 150 to 200° C. for about 1 to 20 hours.

The crosslinkable fluororubber compositions of the invention can be readily and briefly loaded with fillers, effectively roll milled and produced in a mass scale and cure into products having excellent heat resistance, freeze resistance, chemical resistance, oil resistance, and mechanical strength as well as satisfactory rubber properties. With the inventive method, the compositions can be prepared in an industrially advantageous manner.

The fluororubber compositions of the invention can be used in a variety of applications as parts requiring elasticity, for example, sealing materials (e.g., gaskets and packing), diaphragm materials and valve materials in automobile, aircraft, spaceship, electric, electronic, machinery, chemical plant and semiconductor fields. They find a very wide range of industrial use.

EXAMPLE

Examples of the invention are given below by way of illustration and not by way of limitation. In Examples, all parts are by weight and the viscosity is as measured at 25° C.

The materials used in Examples are as shown below.
Polymer (perfluoro compound):
  viscosity 4,400 cSt
  average molecular weight 16,500
  vinyl content 0.013 mol/100 g

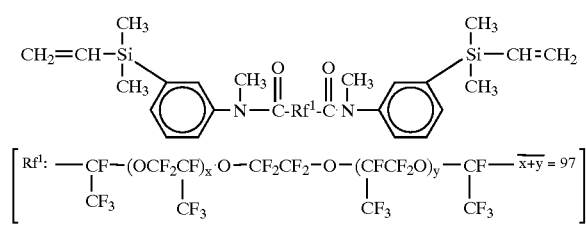

Precure crosslinker (addition reaction crosslinker):

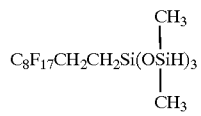

Surface treating agent:

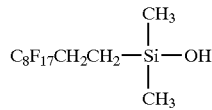

Addition reaction crosslinker:

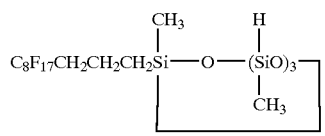

Addition reaction catalyst:
  PL50T (platinum compound catalyst by Shin-Etsu Chemical Co., Ltd.)
Reinforcing filler:
  R976 (fumed silica treated with silicon-base surface treating agent by Nippon Aerosil K.K.)
Reaction regulator:
  ethynyl cyclohexanol, 50% toluene solution
Carbon black:
  Denka Black (acetylene black by Denki Kagaku Kogyo K.K.)

COMPARATIVE EXAMPLE

A fluororubber composition was obtained by mixing ingredients as shown in Table 1 according to the following steps.

Precured Rubber Preparing Step

A 1-liter beaker was charged with the polymer and the crosslinker in a blending ratio as shown in Table 1. The contents were manually mixed for 10 minutes at room temperature using an agitating rod, the catalyst was then added, and mixing was continued for a further 15 minutes. This mixture was allowed to stand for 3 hours at room temperature, during which period the polymer gradually increased its viscosity and eventually became a gum-like polymer.

Filler and Surface Treating Agent Blending Step

The polymer was transferred to a 300-cc laboratory kneader where the temperature was raised to 170° C. and the filler and the surface treating agent were added in amounts as shown in Table 1. Because the polymer was a gel-like gum, it was cumbersome and took 20 minutes to compound the filler with the polymer.

After the filler addition, kneading was continued for one hour at the same temperature, obtaining a base compound.

Heat Resistance Modifier Blending Step

The base compound was taken out of the kneader and wrapped around a twin-roll rubber mill where carbon black as the heat resistance modifier was blended, yielding a final compound.

Crosslinker Blending Step

On the twin-roll rubber mill, the addition reaction regulator and the addition reaction crosslinker were finally blended with the compound, yielding a curable fluororubber composition.

TABLE 1

| Step | Ingredients | Blending amount (pbw) |
|---|---|---|
| Precured rubber preparation | Polymer | 100 |
|  | Precure crosslinker | 1.8 |
|  | Catalyst | 0.2 |
| Filler and surface treating agent blending | Reinforcing filler | 35 |
|  | Surface treating agent | 6 |
| Heat resistance modifier blending | Carbon black | 1 |
| Crosslinker blending | Crosslinker | 1.3 |
|  | Regulator | 0.2 |

Example 1

A fluororubber composition was obtained by mixing ingredients as shown in Table 2 according to the following steps.

Filler and Surface Treating Agent Blending Step

The liquid polymer was fed to a 300-cc laboratory kneader where the temperature was raised to 170° C. and the filler and the surface treating agent were added in amounts as shown in Table 2. Because the polymer was liquid, compounding of the filler with the polymer was easy and completed within 5 minutes.

After the filler addition, kneading was continued for one hour at the same temperature, obtaining a paste compound.

Precure Crosslinker Adding Step

The paste compound in the kneader was cooled to 80° C., after which the precure crosslinker and the catalyst were added thereto, followed by 20 minutes of kneading. As the crosslinker reacted during the kneading period, the paste compound gradually underwent reaction and lost fluidity, becoming a millable rubber compound.

Heat Resistance Modifier Blending Step

The millable compound was taken out of the kneader and wrapped around a twin-roll rubber mill where the compound could be smoothly roll worked. Carbon black as the heat resistance modifier was blended, yielding a final compound.

Crosslinker Blending Step

On the twin-roll rubber mill, the addition reaction regulator and the addition reaction crosslinker were finally blended with the compound, yielding a curable fluororubber composition.

TABLE 2

| Step | Ingredients | Blending amount (pbw) |
| --- | --- | --- |
| Filler and surface treating agent blending | Polymer | 100 |
| | Reinforcing filler | 35 |
| | Surface treating agent | 6 |
| Precuring | Precure crosslinker | 1.8 |
| | Catalyst | 0.2 |
| Heat resistance modifier blending | Carbon black | 1.0 |
| Crosslinker blending | Crosslinker | 1.3 |
| | Regulator | 0.2 |

Example 2

A fluororubber composition was obtained by mixing ingredients as shown in Table 3 according to the following steps.

Filler, Surface Treating Agent and Precure Crosslinker Blending Step

The liquid polymer was fed to a 300-cc laboratory kneader where the temperature was raised to 170° C. and the filler, the surface treating agent and the precure crosslinker were added in amounts as shown in Table 3. Because the polymer was liquid as in Example 1 and the crosslinker was also liquid, which contributed to a reduced viscosity, compounding of the filler with the polymer was very easy and completed within 4 minutes.

After the filler addition, kneading was continued for one hour at the same temperature, obtaining a paste compound having fluidity.

Precure Catalyst and Heat Resistance Modifier Adding Step

The paste compound in the kneader was cooled to 80° C., after which the catalyst and carbon black as the heat resistance modifier were added thereto, followed by 20 minutes of kneading. As the catalyst promoted reaction of the crosslinker during the kneading period, the paste compound gradually underwent reaction and lost fluidity, becoming a millable rubber compound as in Example 1.

Crosslinker Blending Step

The millable compound was taken out of the kneader and transferred to a twin-roll rubber mill where the addition reaction regulator and the addition reaction crosslinker were blended therein, yielding a curable fluororubber composition.

TABLE 3

| Step | Ingredients | Blending amount (pbw) |
| --- | --- | --- |
| Filler, surface treating agent and precure crosslinker blending | Polymer | 100 |
| | Reinforcing filler | 35 |
| | Surface treating agent | 6 |
| | Precure crosslinker | 1.8 |
| Catalyst and heat resistance modifier blending | Catalyst | 0.2 |
| | Carbon black | 1.0 |
| Crosslinker blending | Crosslinker | 1.3 |
| | Regulator | 0.2 |

The properties of the resulting fluororubber compositions were measured by the following tests. The results are shown in Table 4.

Physical Properties

A curable rubber composition was molded in a 75-ton rubber press mold at 150° C. for 10 minutes to form a rubber sheet of 2 mm thick, which was post cured at 200° C. for 4 hours. The sheet was measured for physical properties (hardness, elongation and tensile strength) by the JIS rubber rating method.

TABLE 4

| Sample | Comparative Example | Example 1 | Example 2 |
| --- | --- | --- | --- |
| Hardness, JIS A | 70 | 70 | 69 |
| Tensile strength, kgf/cm$^2$ | 110 | 102 | 105 |
| Elongation, % | 280 | 250 | 240 |
| Tear Strength, kgf/cm | 20 | 14 | 11 |
| Filler compounding time, min | 20 | 5 | 4 |
| Filler compounding time index, % | 100% | 25% | 20% |

As seen from the results of Table 4, the present invention is successful in briefly preparing fluororubber compositions having excellent physical properties through simple compounding steps.

Japanese Patent Application No. 2002-080140 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a crosslinkable fluororubber composition comprising (A) 100 parts by weight of a liquid perfluoro compound having at least two alkenyl groups in the molecule and a divalent perfluoroalkylene or perfluoropolyether structure in the backbone, (B) 1 to 100 parts by weight of a reinforcing filler, (C) 0.01 to 30 parts by weight of a surface treating agent having at least one fluoroalkyl or fluoropolyalkyl ether group and at least one silanol group in the molecule, (D) a compound having at least two hydrosilyl groups in the molecule and capable of addition reaction, in such an amount as to give a molar ratio of hydrosilyl groups in component (D) to alkenyl groups in component (A) in the range of from 0.1 to 0.99, and (E) a sufficient amount to induce reaction of alkenyl groups in component (A) of a crosslinker having at least one hydrosilyl group in the molecule and capable of addition reaction or a peroxide crosslinker, said method comprising the steps of:
- (1) combining and mixing components (A) to (C) to form a liquid or paste composition,
- (2) adding component (D) to the liquid or paste composition for causing crosslinking to some alkenyl groups in the composition to form a millable composition, and
- (3) combining and mixing component (E) with the millable composition.

2. The method of claim 1, further comprising the step of adding (F) a heat resistance modifier selected from the group consisting of carbon black, metal oxide, metal hydroxide and a mixture thereof to the millable composition between steps (2) and (3).

3. The method of claim 1, wherein the perfluoro compound (A) is of the following general formula (1):

$$CH_2=CH-(X)_p-(Rf-Q)_a-Rf-(X')_p-CH=CH_2 \quad (1)$$

wherein X is independently $-CH_2-$, $-CH_2O-$, $-CH_2OCH_2-$, $-Y-NR^1SO_2-$ or $-Y-NR^1-CO-$ wherein Y is $-CH_2-$ or $$-\underset{\underset{CH_3}{|}}{\overset{\overset{CH_3}{|}}{Si}}-\!\!\bigcirc\!\!\text{\Large ,}$$

and $R^1$ is hydrogen or a substituted or unsubstituted monovalent hydrocarbon group, X' is independently $-CH_2-$, $-CH_2O-$, $-CH_2OCH_2-$, $-SO_2NR^1-Y'-$ or $-CO-NR^1-Y'-$ wherein Y' is $-CH_2-$ or $$\bigcirc\!\!-\underset{\underset{CH_3}{|}}{\overset{\overset{CH_3}{|}}{Si}}-\text{,}$$

and $R^1$ is hydrogen or a substituted or unsubstituted monovalent hydrocarbon group, Rf is a divalent perfluoroalkylene or divalent perfluoropolyether group, p is independently equal to 0 or 1, Q is a group of the following general formula (2), (3) or (4):

$$-\overset{O}{\underset{\|}{C}}-\underset{\underset{}{|}}{\overset{\overset{R^1}{|}}{N}}-R^3-\underset{\underset{}{|}}{\overset{\overset{R^1}{|}}{N}}-\overset{O}{\underset{\|}{C}}- \quad (2)$$

$$-(X)_p-CH_2CH_2R^4CH_2CH_2-(X')_p \quad (3)$$

$$-\overset{O}{\underset{\|}{C}}-\underset{\underset{R^3}{\diagdown}}{\overset{\overset{R^3}{\diagup}}{N}}\!\!\!\!\!\!\!\!\!\!\overset{\overset{}{}}{\underset{\underset{}{}}{N}}-\overset{O}{\underset{\|}{C}}- \quad (4)$$

wherein X, X', p, and $R^1$ are as defined above, $R^3$ is a substituted or unsubstituted divalent hydrocarbon group, and $R^4$ is a substituted or unsubstituted divalent hydrocarbon group which may be separated by at least one intervening atom selected from oxygen, nitrogen, silicon and sulfur atoms, or a group of the following general formula (5) or (6):

$$-\underset{\underset{R^5}{|}}{\overset{\overset{R^5}{|}}{Si}}-R^6-\underset{\underset{R^5}{|}}{\overset{\overset{R^5}{|}}{Si}}- \quad (5)$$

$$-\underset{}{\overset{R^5}{\underset{|}{Si}}}\!\!\overset{R^6}{\underset{R^6}{\diagup\!\!\!\diagdown}}\!\!\underset{}{\overset{R^5}{\underset{|}{Si}}}- \quad (6)$$

wherein $R^5$ is a substituted or unsubstituted monovalent hydrocarbon group and $R^6$ is a group containing in its backbone structure at least one atom selected from carbon, oxygen, nitrogen, silicon and sulfur atoms, and "a" is an integer inclusive of 0.

4. The method according to claim 3, wherein Rf of formula (1) is at least one selected from the group consisting of:
- a divalent perfluoroalkylene group represented by the formula $-C_mF_{2m}$ wherein m is from 1 to 10; or
- a divalent perfluoropolyether group represented by the formula $$-\underset{\underset{X}{|}}{CF}-(OCF_2CF)_p-O-(CF_2)_r-O-(CFCF_2O)_q-\underset{\underset{X}{|}}{CF}-$$

wherein X is F or $CF_3$, p, q and r are integers satisfying $p \geq 1$, $q \geq 1$, $2 \geq p+q \leq 200$, and $0 \leq r \leq 6$.

5. The method according to claim 1, wherein perfluoro compound is a linear perfluoro compound having a viscosity of 25 to 1,000,000 centistokes at 25° C.

6. The method according to claim 1, wherein the reinforcing filler (B) is at least one selected from the group consisting of fumed silica, colloidal silica, diatomaceous earth, quartz flour, glass fibers, carbon, metal oxide, metal carbonate; and wherein the reinforcing filler (B) is optionally treated with at least one surface treating agent.

7. The method of claim 1, wherein the reinforcing filler (B) comprises fumed silica or fumed silica treated with a surface treating agent containing silicon in the molecule.

8. The method of claim 1, wherein the surface treating agent (C) is selected from the compounds of the following formulas and mixtures thereof:

$$C_8F_{17}CH_2CH_2-\underset{\underset{CH_3}{|}}{\overset{\overset{CH_3}{|}}{Si}}-OH, \quad C_4F_9CH_2CH_2-\underset{\underset{CH_3}{|}}{\overset{\overset{CH_3}{|}}{Si}}-OH,$$

$$HO-\underset{\underset{CH_3}{|}}{\overset{\overset{CH_2CH_2CF_3}{|}}{(SiO)_n}}-H \quad \text{wherein n is an integer of 1 to 10,}$$

$$C_8F_{17}CH_2CH_2Si(-\underset{\underset{CH_3}{|}}{\overset{\overset{CH_3}{|}}{OSi}}-OH)_2, \quad C_8F_{17}CH_2CH_2SiO-\underset{\underset{CH_3}{|}}{\overset{\overset{CH_3}{|}}{Si}}-OH,$$

$$C_8F_{17}CH_2CH_2Si(-\underset{\underset{CH_3}{|}}{\overset{\overset{CH_3}{|}}{OSi}}-OH)_3,$$

-continued

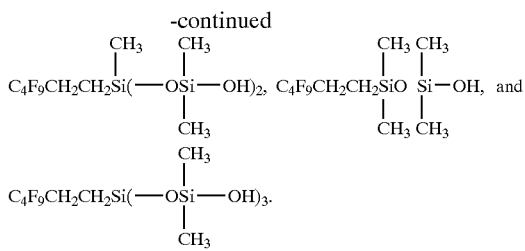

9. The method of claim 1, wherein the hydrosilyl-bearing compound (D) is of the following general formula (7) or (8):

$$Z\text{-}CH_2CH_2\text{—}(X)_p\text{—}Rf\text{—}(X')_p\text{—}CH_2CH_2\text{-}Z \quad (7)$$

$$Rf\text{—}(X)_p\text{—}CH_2CH_2\text{-}Z \quad (8)$$

wherein X, X', p, and Rf are as defined above, and Z is a group of the following general formula (9):

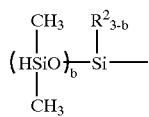 (9)

wherein $R^2$ is a substituted or unsubstituted monovalent hydrocarbon group and b is equal to 1, 2 or 3 for the compound of formula (7) and equal to 2 or 3 for the compound of formula (8).

10. The method of claim 1, wherein the composition further comprises (F) a heat resistance modifier selected from the group consisting of carbon black, metal oxide, metal hydroxide and a mixture thereof.

11. The method according to claim 1, wherein an amount of the reinforcing filler (B) is 1 to 100 parts by weight per 100 parts by weight of component (A).

12. The method according to claim 1, wherein the component (A) reacts with component (D) using at least one platinum group metal compound as a catalyst.

13. The method according to claim 12, wherein the platinum group metal compound is at least one selected from the group consisting of: chloroplatinic acid; a complex of chloroplatinic acid with an olefin; a complex of chloroplatinic acid with an alcohol or vinylsiloxane; platinum on silica, alumina or carbon; $RhCl(PPh_3)_3$; $RhCl(CO)(PPh_3)_2$; $RhCl(C_2H_4)_2$; $Ru_3(CO)_{12}$; $IrCl(CO)(PPh_3)_2$; and $Pd(PPh_3)_4$.

14. The method according to claim 1, wherein the crosslinker (E) is an organohydrogenpolysiloxane having at least two hydrosilyl groups per molecule.

15. The method according to claim 1, wherein the crosslinker (E) is a peroxide crosslinker.

* * * * *